United States Patent Office 2,942,033
Patented June 21, 1960

2,942,033
STABILIZATION OF POLYOXYALKYLENE COMPOUNDS

Donald G. Leis, St. Albans, and Eldon C. Stout, South Charleston, W. Va., assignors to Union Carbide Corporation, a corporation of New York No Drawing. Filed July 11, 1957, Ser. No. 671,132

9 Claims. (Cl. 260—611.5)

This invention relates to a process for the stabilization of polyoxyalkylene componnds against oxidation. More particularly, the invention relates to polyoxyalkylene compositions having incorporated therein stabilizing quantities of an organic antioxidant.

Polyoxyalkylene componds, in general, are well known to the art, and find suitable utilization in a number of diverse applications. By way of illustration, such compounds are frequently employed as emulsifiers, synthetic lubricants, hydraulic fluids, plasticizers, detergents, heat transfer liquids, and the like. Disadvantageously, however, these compounds are readily subject to oxidative decomposition or degradation upon prolonged exposure to air. In such compounds, chemical breakdown resulting from oxidation is ordinarily evidenced: (a) by an increase in the saponification number of the compound; (b) by the development of an "aldehydic" odor and bitter taste; and (c) by an increase in the "sulfuric acid test color" of the compound, i.e., the color developed upon reaction thereof with concentrated sulfuric acid. Moreover, in higher molecular weight polyoxyalkylene compounds, viz., compounds having an average molecular weight in excess of approximately 4,000, a substantial decrease in the average molecular weight and in viscosity also occurs, accompanied in many instances by a change from solid to liquid state. As a consequence of this susceptibility to oxidation, many possibilities of use for polyoxyalkylene compounds unfortunately are precluded.

The present invention is based upon the discovery that polyoxyalkylene compounds may effectively be stabilized against oxidative decomposition or degradation by the incorporation therein of minor amounts of specific alkylated or alkoxylated phenols during the course of their production. Stabilized in the manner hereinafter prescribed, the polyoxyalkylene compositions of this invention advantageously demonstrate greatly reduced oxidative effects upon exposure to air and storage. A marked contrast in this respect may therefore be observed between unstabilized polyoxyalkylene compound and identical material stabilized in accordance with the process of this invention. Furthermore, the stabilized polyoxyalkylene compositions of this invention may be employed as intermediate compounds in the production of derivatives, particularly aliphatic ether and ester derivatives thereof, which similarly exhibit improved stability against oxidation.

The term "polyoxyalkylene compound" as employed herein is meant to describe those compounds prepared by the reaction of a 1,2-alkylene oxide with either water or an aliphatic mono-, di-, tri-, or polyhydric alcohol, in the presence of an alkaline catalyst. In addition, the described compounds are characterized by recurring oxyalkylene groups of the type corresponding to the formula:

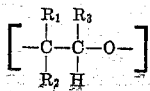

wherein $R_1$, $R_2$ and $R_3$ represent hydrogen or alkyl radicals. Of particular concern are the polyoxyalkylene compounds prepared by the reaction of at least one 1,2-alkylene oxide, such as ethylene oxide, 1,2-propylene oxide, and 1,2-butylene oxide, etc., with either water, an alkyl monohydroxy alcohol, and alkylene glycol, such as ethylene glycol and propylene glycol, etc., or an etheric di-, or tri-alkylene glycol, such as diethylene glycol $$(HO[C_2H_4]O[C_2H_4]OH)$$

dipropylene glycol $$(HO[C_3H_6]O[C_3H_6]OH)$$

and triethylene glycol $$(HO[C_2H_4]O[C_2H_4]O[C_2H_4]OH)$$

etc. Typical polyoxyalkylene compounds which may be stablized in accordance with the process of this invention are the polyoxyalkylene glycols, e.g., polyoxyethylene glycols, prepared by the addition of ethylene oxide to water, ethylene glycol, or diethylene glycol; polyoxypropylene glycols, prepared by the addition of 1,2-propylene oxide to either water, propylene glycol, or dipropylene glycol; and mixed oxyethylene-oxypropylene polyglycols, prepared in a similar manner, utilizing, however, a mixture or sequential addition of ethylene oxide and 1,2-propylene oxide. Also typical of the polyoxyalkylene compounds are polyoxyalkylene glycol monoalkyl ethers of the type described in U.S. 2,213,477, 2,448,664, 2,425,755, and 2,677,700, prepared by reacting a 1,2-alkylene oxide such as ethylene oxide and 1,2-propylene oxide, mixtures thereof, or ethylene oxide and 1,2-propylene oxide sequentially, with an alkyl monohydroxy alcohol.

The alkylated or alkoxylated phenols employed as stabilizers in the process of this invention are well known compounds, and may be represented by the formula:

wherein $R_4$ designates a hydrogen, alkyl or alkoxy radical, and $R_5$ and $R_6$ are such that when $R_4$ is a hydrogen or alkyl radical, $R_5$ and $R_6$ designate either hydrogen or alkyl radicals, at least one of which is an alkyl radical; and when $R_4$ is an alkoxy radical, $R_5$ and $R_6$ designate either hydrogen or alkyl radicals, without limitation. The alkyl radicals contained therein may be either primary, secondary, or tertiary alkyl groups, preferably possessing from one to about four carbon atoms. Illustrative of the stabilizers suitable for use in this invention are 2,6-ditertiarybutyl-para-cresol, para-hydroxyanisole, 2,6-ditertiarybutyl phenol, 2-tertiarybutyl-para-cresol, 2-butyl-para-hydroxyanisole, 2,6 - dibutyl-para-hydroxyanisole, and 2,6-dimethyl-para-cresol, etc.

In an embodiment of the invention, the reactants heretofore mentioned, i.e., a 1,2-alkylene oxide and either water or an aliphatic mono-, di-, tri-, or polyhydric alcohol, are initially condensed in the presence of an alkaline catalyst, such as an alkali metal hydroxide or alcoholate, according to standard processes for the production of polyoxyalkylene compounds. The stabilizer of this invention is subsequently dissolved in the crude reaction product upon completion of the condensation reaction, and during or immediately following the partial or complete neutralization of the crude reaction product. Desirably, an inert (oxygen-free) atmosphere, such as nitrogen or argon, is maintained in the reaction system at least until the addition of stabilizer is complete, and preferably until the final product is isolated. The occurrence of unwanted side reactions is thereby minimized.

Neutralization of the crude reaction product is conventionally achieved by the suitable addition of acid, such as phosphoric acid, concentrated sulfuric acid or concentrated hydrochloric acid, to the crude reaction product. Of prime importance to the process of this invention is the introduction of stabilizer after the pH of the crude reaction product has been adjusted e.g., by the addition of acid, to within a range of from approximately 6 to 11. The term "pH" herein designates a value taken to represent the acidity or alkalinity of the crude reaction product, and is defined as the logarithm of the reciprocal of the hydrogen-ion concentration. The addition of acid therefore serves to lower the pH of the crude reaction product. For purposes of the present invention, the pH values are generally determined by measuring the pH of a five percent by weight mixture or solution of the crude reaction product with water. Preferably the stabilizer is added when the pH of the crude reaction product has been adjusted to within a range of from approximately 7 to 8. Optimum results may thereby be achieved. The addition of stabilizer to the crude reaction product at a pH of less than about 6, or greater than about 11, however, has not proven of substantial value to the reduction of oxidative decomposition or degradation in polyoxyalkylene compounds.

It is essential that no significant time lapse occur between the complete neutralization of the crude reaction product and the subsequent addition of stabilizer, since the existence of unstabilized material in a neutral or acidic medium (at a pH of 7 or less) for a prolonged period of time serves generally to impare the effectiveness of the present process. When it is desired to add the stabilizer to the crude reaction product at a pH of about 7, or less, the stabilizer should accordingly be introduced within not more than about one hour after neutralization. The addition of stabilizer within periods of less than 30 minutes after neutralization is preferred in order to achieve a maximum inhibitive effect against oxidation.

The stabilizer may be added as a solid, soluble compound, or as a solution in which the stabilizer is dissolved in a polyoxyalkylene glycol, an alcohol, or any non-reactive organic solvent. Preferably, the stabilizer is added to the crude reaction product in a concentration of from about 100 to 5,000 parts of stabilizer per million parts of polyoxyalkylene compound by weight. This concentration requirement is not narrowly limited, however, and any concentration of above approximately 10 parts of stabilizer per million parts of polyoxyalkylene compound by weight may be employed in the process of the invention with satisfactory results. The use of concentrations below approximately 10 parts of stabilizer per million parts of polyoxyalkylene compound by weight is generally not effective in stabilizing the polyoxyalkylene compound against oxidation; while no commensurate advantage may be gained by an increase in stabilizer concentration above approximately 5,000 parts of stabilizer per million parts of polyoxyalkylene compound by weight.

The addition of stabilizer may be carried out at any temperature within a range of from about the melting point of the polyoxyalkylene compound to 150° C. Especially good results may be obtained by the addition of stabilizer at a temperature of from 60° C. to 90° C. At temperatures above approximately 150° C., however, the disadvantage of increasing thermal decomposition of the polyoxyalkylene compound unfortunately overcomes the advantage of stabilization afforded by the process of the invention.

When the addition or dissolution of stabilizer is complete, the pH of the crude reaction product is adjusted to a final, desired level in accordance with standard processes for the production of polyoxyalkylene compounds. Generally this final pH value is within a range of from approximately 6 to 7. The polyoxyalkylene product incorporating the dissolved stabilizer may then be recovered by any convenient method, such as filtration. The stabilized polyoxyalkylene composition can subsequentially be stored or employed as an intermediate compound in processes for the production of ester or diether derivatives thereof, with little or no accompanying oxidative decomposition or degradation.

The following examples will clearly illustrate both the principle and practice of the present invention.

EXAMPLE I

A series of crude polyoxyethylene glycol products having an average molecular weight of approximately 200, 300, 400, 600, 1,000, 4,000, and 6,000, were conventionally prepared by the condensation of ethylene oxide with ethylene glycol in the presence of a sodium hydroxide catalyst and a nitrogen atmosphere. Upon completion of the condensation reaction, 4,000 gram samples of each of the crude polyoxyethylene glycol products were charged individually to five-liter glass kettles, equipped with a stirrer, thermometer, and nitrogen vent. Care was taken to assure the maintenance of an inert atmosphere in the reaction system. The temperature of the crude reaction product in the kettle was adjusted to approximately 65° C.±5° C., and the alkaline catalyst neutralized by the addition of concentrated phosphoric acid until the pH of the crude reaction product reached approximately 7.5±0.5. Four tenths of a gram of 2,6-ditertiarybutyl-para-cresol was then added to each of the partially neutralized samples, and dissolved therein with stirring. After the addition of stabilizer, the pH of the crude reaction product was adjusted by the further addition of acid to a pH of approximately 6.5±0.5. The resulting polyoxyethylene glycol product incorporating the dissolved stabilizer was then recovered by filtration with the assistance of a diatomaceous earth filter aid.

Table A below summarizes the data obtained when the products of this experiment were analyzed for evidence of oxidation. In addition, a control was run for each of the polyoxyethylene glycol products in which the incorporation of stabilizer was omitted. Comparative data obtained therefrom is also tabulated. In the table, the concentration of stabilizer is indicated as parts per million parts of polyoxyethylene glycol by weight. The sulfuric acid test color, obtained by heating 95 milliliters of the product with 5 milliliters of concentrated sulfuric acid, was measured by comparison with platinum-cobalt colors standards and is so indicated in the table. The saponification number respresents the number of milligrams of potassium hydroxide required to saponify one gram of the polyoxyethylene glycol. The odors of the compounds were determined by comparison with various known aldehydic materials possessing strong and characteristic aldehydic odors.

*Table A*

| Average Molecular Weight of Product | Concentration of Stabilizer | Sulfuric Acid Test Color | Saponification Number | Odor |
| --- | --- | --- | --- | --- |
| 200 | 0 | --- | 0.47 | Mild. |
|     | 100 | --- | 0.00 | None. |
| 300 | 0 | 30 | 0.25 | Mild. |
|     | 100 | 20 | 0.00 | None. |
| 400 | 0 | 100 | 0.34 | Mild. |
|     | 100 | 50 | 0.00 | None. |
| 600 | 0 | 110 | 0.48 | Mild. |
|     | 100 | 30 | 0.19 | None. |
| 1000 | 0 | 70 | 0.38 | Strong. |
|      | 100 | 50 | 0.39 | None. |
| 6000 | 0 | --- | 0.61 | Mild. |
|      | 100 | --- | 0.43 | None. |

Table A above, serves to indicate the effectiveness of the process of the invention in stabilizing polyoxyalkylene compounds against oxidation. A comparison of the data obtained for each series of stabilized and unstabilized preparations in general shows a reduction in sulfuric acid test color, saponification number, and odor resulting from the addition of stabilizer in the manner prescribed by the present invention.

EXAMPLE II

In a manner similar to that described in Example I a series of both stabilized and unstabilized polyethylene glycol products of varying molecular weight were prepared, utilizing para-hydroxyanisole as the stabilizer. Table B, below, summarizes the data obtained when these products were analyzed for evidence of oxidation. The data was obtained, and is set forth in the table, in accordance with the methods described in Example I.

Table B

| Average Molecular Weight of Product | Concentration of Stabilizer | Sulfuric Acid Test Color | Saponification Number | Odor |
|---|---|---|---|---|
| 00 | 0 | | 0.47 | Mild. |
|  | 100 | | 0.29 | None. |
| 300 | 0 | 30 | 0.25 | Mild. |
|  | 100 | 30 | 0.25 | None. |
| 400 | 0 | 100 | 0.34 | Mild. |
|  | 100 | 60 | 0.10 | None. |
| 600 | 0 | 110 | 0.48 | Mild. |
|  | 100 | 60 | 0.16 | None. |
| 1000 | 0 | 90 | 1.13 | Strong. |
|  | 100 | 65 | 0.44 | None. |
| 4000 | 0 | | 0.75 | Mild. |
|  | 100 | | 0.22 | None. |
| 6000 | 0 | | 0.61 | Mild. |
|  | 100 | | 0.31 | None. |

Table B further serves to illustrate the effectiveness of the process of the invention in stabilizing polyoxyalkylene compounds against oxidative degradation or decomposition. This may be seen by comparing the data obtained for each series of stabilized and unstabilized preparations, and noting the general reduction in the sulfuric acid test color, saponification number, and odor that occurs as a result of stabilization.

EXAMPLE III

To illustrate the stability of polyoxyalkylene compositions obtained by the process of this invention upon exposure to air and subsequent storage, a series of both stabilized and unstabilized polyoxyethylene glycol products of varying molecular weight were prepared in a manner similar to that described in Example I, utilizing both 2,6-ditertiarybutyl-para-cresol and para-hydroxyanisole as stabilizers. The preparations were tested for evidence of oxidation after an elapsed period of time during which the material was stored in glass bottles under an atmosphere of air. The summarized data relating to these tests was obtained, and is set forth in Table C and D, below, as heretofore described for the Tables A and B. Table C concerns data obtained when 2,6-ditertiarybutyl-para-cresol was employed as the stabilizer, and Table D concerns data obtained when para-hydroxyanisole was utilized.

Table C

| Average Molecular Weight of Product | Concentration of Stabilizer | Days of Storage | Sulfuric Acid Test Color | Saponification Number | Odor |
|---|---|---|---|---|---|
| 200 | 0 | 68 | 60 | 0.50 | Mild. |
|  | 100 | 68 | 35 | 0.37 | None. |
| 300 | 0 | 80 | 50 | 0.20 | Mild. |
|  | 100 | 80 | 20 | 0.16 | None. |
| 400 | 0 | 236 | 1000 | 3.34 | Strong. |
|  | 100 | 236 | 40 | 0.03 | None. |
| 600 | 0 | 121 | 120 | 0.54 | Strong. |
|  | 100 | 121 | 60 | 0.37 | None. |
| 1000 | 0 | 212 | 80 | 0.62 | Strong. |
|  | 100 | 212 | 80 | 0.45 | None. |
| 4000 | 0 | 47 | | 1.26 | Mild. |
|  | 100 | 47 | | 0.75 | None. |
| 6000 | 0 | 49 | | 1.53 | Mild. |
|  | 100 | 49 | | 0.43 | None. |

Table D

| Average Molecular Weight of Product | Concentration of Stabilizer | Days of Storage | Sulfuric Acid Test Color | Saponification Number | Odor |
|---|---|---|---|---|---|
| 200 | 0 | 68 | | 0.50 | Mild. |
|  | 100 | 68 | | 0.34 | None. |
| 300 | 0 | 80 | 50 | 0.20 | Mild. |
|  | 100 | 80 | 40 | 0.17 | None. |
| 400 | 0 | 85 | 1000 | 3.30 | Mild. |
|  | 100 | 85 | 60 | 0.13 | None. |
| 600 | 0 | 30 | 140 | 0.45 | Mild. |
|  | 100 | 30 | 60 | 0.14 | None. |
| 1000 | 0 | 54 | 140 | 1.35 | Strong. |
|  | 100 | 54 | 90 | 0.29 | None. |
| 4000 | 0 | 47 | | 1.28 | Mild. |
|  | 100 | 47 | | 0.15 | None. |
| 6000 | 0 | 49 | | 1.53 | Mild. |
|  | 100 | 49 | | 0.30 | None. |

It is to be observed from Tables C and D, above, that the corresponding unstabilized samples of each series of polyoxyethylene glycol products demonstrated an undesirable increase in sulfuric acid test color, saponification number, and odor upon storage and exposure to air.

EXAMPLE IV

Eight thousand grams of a crude product which had been prepared by the addition of a mixture of equal parts ethylene oxide and 1,2-propylene oxide to butanol in the presence of potassium hydroxide catalyst was charged to a 12-liter kettle equipped with a thermometer well, stirrer, and nitrogen sparge. The crude reaction product had a viscosity of approximately 5100 Sayboldt Universal Seconds at a temperature of 100° F. Care was taken to maintain the continual presence of an inert atmosphere in the reaction system. After heating the crude product to a temperature of between 60° C. to 70° C., the catalyst was carefully neutralized with phosphoric acid until the pH was approximately 7.5±0.5. At this point, 0.8 gram of 2,6-ditertiarybutyl-para-cresol was immediately added and allowed to dissolve. After the addition of the stabilizer, the pH of the crude reaction product was adjusted by the addition of phosphoric acid to a value of approximately 6.5±0.5. The oxyethylene-oxypropylene polyglycol monobutyl ether product incorporating the dissolved stabilizer was then filtered with the use of a diatomaceous earth filter aid.

The stabilized polyoxyalkylene compound was analyzed for evidence of oxidation, and compared with unstabilized material prepared in a similar manner. The data obtained thereby is tabulated in Table E below. In the table, concentration of stabilizer, saponification number and odor are set forth as indicated previously for Table A through D. The viscosity was determined and is tabulated as Sayboldt Universal Seconds at a temperature of 100° F. The product color was measured by comparison with platinum-cobalt color standards, and is so indicated in the table.

Table E

| Concentration of Stabilizer | Color | Saponification Number | Odor | Viscosity |
|---|---|---|---|---|
| 0 | 60 | 0.94 | Strong | 4870 |
| 100 | 60 | 0.71 | Mild | 5125 |

From Table E, above, it may be seen that the stabilized polyoxyalkylene compound advantageously evidenced a lower saponification number, less oder, and a higher viscosity than the corresponding unstabilized material. Improved stability against oxidation is thereby indicated.

EXAMPLE V

Eight thousand grams of a crude product which had been prepared by the addition of propylene oxide to butanol in the presence of potassium hydroxide catalyst was charged to a 12-liter kettle equipped with a thermometer well, stirrer, and nitrogen sparge. The crude reaction product had a viscosity of approximately 1700 Sayboldt Universal Seconds at a temperature of 100° F. Care was taken to maintain the continual presence of an inert atmosphere in the reaction system. After heating the crude product to a temperature of between 60° C. to 70° C., the catalyst was carefully neutralized by the addition of phosphoric acid until the pH was approximately 7.5±0.5. At this point, 0.8 gram of 2,6-ditertiarybutyl-para-cresol was immediately added and allowed to dissolve. After the addition of the antioxidant, the pH of the crude reaction product was adjusted by the addition of phosphoric acid to a value of approximately 6.5±0.5. The polyoxypropylene glycol monobutyl ether product incorporating the dissolved stabilizer was filtered with the use of a diatomateous earth filter aid. The stabilized product demonstrated improved stability to oxidative degradation and decomposition.

EXAMPLE VI

Seven thousand five hundred grams of a crude product, prepared by the addition of 1,2-propylene oxide to dipropylene glycol in the presence of a potassium hydroxide catalyst was charged to a 12-liter glass kettle equipped with a thermometer well, stirrer and nitrogen vent. The crude polyoxypropylene glycol product had an average molecular weight of approximately 2,000. Care was taken to maintain the continual presence of an inert atmosphere in the reaction system. After the temperature of the crude reaction product was adjusted to approximately 90° C., phosphoric acid was added until the pH was approximately 7.8. At this point 0.75 gram of 2,6-ditertiarybutyl-para-cresol was added to the crude reaction product and dissolved with stirring. After the addition of the antioxidant, the product was neutralized with additional phosphoric acid to a pH value of approximately 4.8. The polyoxypropylene glycol composition demonstrated improved stability to oxidative degradation and decomposition.

What is claimed is:

1. In a process for the production of polyoxyalkylene compounds which comprises reacting a 1,2-alkylene oxide with a hydroxyl-containing compound selected from the group consisting of water and aliphatic mono-, di-, tri-, and polyhydric alcohols in the presence of an alkaline catalyst, that improvement which comprises adjusting the pH of the crude reaction product to within a range of from about 6 to about 11 and thereafter incorporating in said crude reaction product, at a temperature up to about 150° C. and at a time not more than about one hour subsequent to any complete neutralization of said crude reaction product, a stabilizing quantity of a phenolic compound corresponding to the formula:

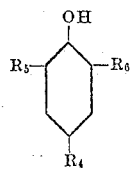

wherein $R_4$ is a member selected from the group consisting of hydrogen, alkyl, and alkoxy radicals, and $R_5$ and $R_6$ are members selected from the group consisting of hydrogen and alkyl radicals, at least one of which is an alkyl radical when $R_4$ is selected from the group consisting of hydrogen and alkyl radicals.

2. In a process for the production of polyoxyalkylene compounds which comprises reacting at least one 1,2-alkylene oxide selected from the group consisting of ethylene oxide, 1,2-propylene oxide and 1,2-butylene oxide with a hydroxyl-containing compound selected from the group consisting of water, alkyl monohydroxy alcohols, alkylene glycols, dialkylene glycols and trialkylene glycols in the presence of an alkaline catalyst, that improvement which comprises adjusting the pH of the crude reaction product to within a range of from about 7 to about 8 and thereafter incorporating in said crude reaction product, at a temperature up to about 150° C. and at a time no more than about thirty minutes subsequent to any complete neutralization of said crude reaction product, a stabilizing quantity of a phenolic compound corresponding to the formula:

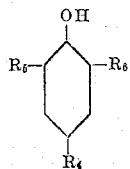

wherein $R_4$ is a member selected from the group consisting of hydrogen, alkyl, and alkoxy radicals, and $R_5$ and $R_6$ are members selected from the group consisting of hydrogen and alkyl radicals at least one of which is an alkyl radical when $R_4$ is selected from the group consisting of hydrogen and alkyl radicals, said alkyl and alkoxy radicals containing from one to about four carbon atoms, and separating the stabilized polyoxyalkylene composition so formed.

3. That improvement according to claim 2 wherein the phenolic compound is incorporated in a concentration of from about 100 to 5,000 parts of phenolic compound per million parts of polyoxyalkylene compound by weight.

4. That improvement according to claim 2 wherein the phenolic compound is 2,6-ditertiarybutyl-para-cresol.

5. That improvement according to claim 2 wherein the phenolic compound is para-hydroxyanisole.

6. That improvement according to claim 2 wherein the phenolic compound is 2,6-ditertiarybutyl phenol.

7. That improvement according to claim 2 wherein the phenolic compound is 2-tertiarybutyl-para-cresol.

8. That improvement according to claim 2 wherein the phenolic compound is 2-butyl-para-hydroxyanisole.

9. That improvement according to claim 2 wherein the phenolic compound is 2,6-dibutyl-para-hydroxyanisole.

References Cited in the file of this patent
UNITED STATES PATENTS

| | | |
|---|---|---|
| 2,481,278 | Ballard et al. | Sept. 6, 1949 |
| 2,679,459 | Rosenwald | May 25, 1954 |
| 2,706,189 | Pruitt et al. | Apr. 12, 1955 |
| 2,786,080 | Patton | Mar. 19, 1957 |